April 8, 1952  J. J. MATELENA  2,592,444
INFLATABLE AERIAL PROJECTION DISPLAY DEVICE
Filed April 12, 1950  2 SHEETS—SHEET 1

INVENTOR.
JOHN J. MATELENA
BY
ATTORNEYS.

April 8, 1952     J. J. MATELENA     2,592,444
INFLATABLE AERIAL PROJECTION DISPLAY DEVICE Filed April 12, 1950     2 SHEETS—SHEET 2

INVENTOR.
JOHN J. MATELENA
BY
ATTORNEYS.

Patented Apr. 8, 1952

2,592,444

UNITED STATES PATENT OFFICE 2,592,444

INFLATABLE AERIAL PROJECTION DISPLAY DEVICE

John J. Matelena, Trenton, N. J.

Application April 12, 1950, Serial No. 155,407

7 Claims. (Cl. 88—24)

This invention relates to an inflatable structure or balloon such as may be used for advertising display purposes and more particularly to a display device which may be tethered at night in some conspicuous place where advertising matter may be widely observed.

Heretofore, advertising or other subject-matter displayed from a balloon in the air has been in the form of lamps or fluorescent or other materials disposed on the outside surface of the balloon.

In order to provide moving displays of advertising matter it has generally been necessary to provide a plurality of lamps on the surface of the balloon which are successively illuminated in such a manner as to give the illusion of motion. In some instances a blimp is employed wherein the sequence of illumination of lamps mounted on the surface of the balloon of the blimp is controlled by a mechanism carried in the gondola of the blimp. In other instances, flood lighting arrangements carried by the gondola are arranged to illuminate display material disposed on the surface of the balloon. It will be apparent that the operation of these display devices involves considerable expense.

It is an object of this invention to provide an aerial display device in which advertising matter is projected on the walls thereof by means located within the device.

It is another object of this invention to provide an aerial display device in which moving images projected from a central source are made to appear on the outer surface of the device.

It is another object of this invention to provide an aerial display device in which moving images are projected onto the surface of the device from a central source which is completely isolated from the gas chamber.

It is another object of this invention to provide an inflated aerial display device having a projector, for projecting images upon the walls of the device, which is located within the device and removable from the device without requiring deflation of the device.

These and other objects of the invention will become apparent from the following description when read in conjunction with the accompanying drawings, in which.

Figure 1:
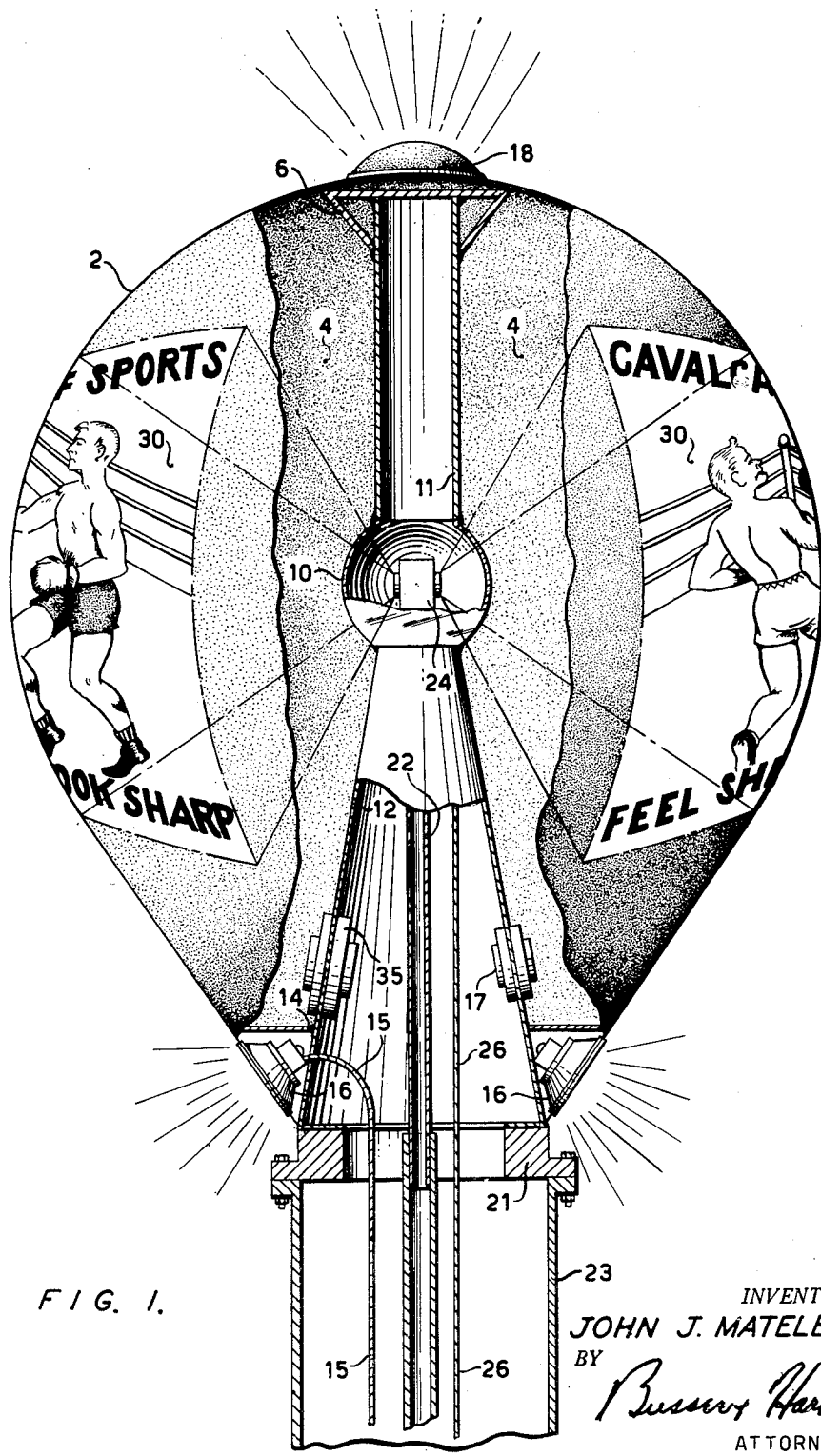
Figure 1 is an elevation partly in section showing the display device disclosed herein mounted on a fixed base.

Referring to the figures there is shown a balloon or outer cover 2 which is made from balloon silk or plastic material such as polyvinylacetate or impregnated fabric material suitable for providing for the retention of the gas or air used to fill the gas chamber 4. The outer cover may be made of either translucent material or clear material coated with a suitable translucent material. These materials may be either white or colored.

Mounted within the outer cover is the upper supporting framework 6, the upper tunnel 11 and the lower tunnel 12. Supported between the upper tunnel 11 and the lower tunnel 12 is the transparent dome 10. The dome 10 may be formed of a clear plastic material such as an acrylate plastic or other suitable transparent material having sufficient stiffness to resist the pressure of the gas within the gas chamber. The dome is opened to the atmosphere by means of the tunnel 12. The tunnels 11 and 12 may be formed of aluminum or other suitable light metal or plastic material having sufficient stiffness to withstand the pressure of the gas within the gas chamber. The lower portion of the outer cover 2 contains enclosures 14 in which loud speakers 16 are mounted. The enclosures 14 are supported from the tunnel 12 and the speakers mounted therein are isolated from the gas chamber. Mounted on the top of the outer cover is a suitable aviation warning light 18.

In the wall of the tunnel 12 there is mounted the gas supply connection 17 to which lines may be connected for supplying gas to the gas chamber for inflating the balloon or outer cover. There is also provided in the wall of the tunnel 12 a deflating valve 35. This valve may be used for the rapid deflation of the balloon or outer cover such as would be desired, for example, in the event of a severe wind storm.

Attached to the lower end of the tunnel 12 is the ballast flange 21. When the device is used as shown in Figure 1 the ballast flange may be attached to a supporting structure 23, which is mounted on the ground. It will be apparent that this attachment may be by means of bolts, as shown, or that the mounting flange may be attached to a supporting structure in such a fashion as to permit the mounting flange and the entire display device to be rotated. Where the word "ground" is used it will be understood that the meaning is not to be limited to the earth itself. The mounting structure may be attached to a portable truck, the roof of a building or to any other suitable fixed object.

In the form of the device shown in Figure 1 there is provided a telescoping mast 22 which may be operated by means, for example, of hydraulic pressure for expanding the mast upwardly.

Figure 2:
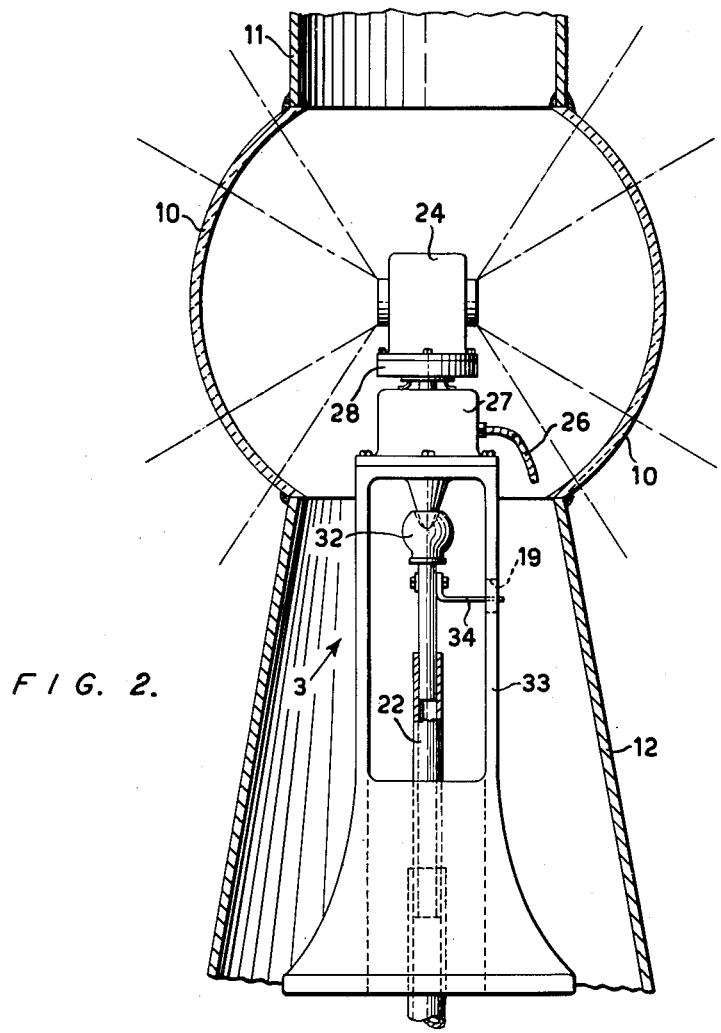
Figure 2 is an elevation showing details of the projector mounting assembly.

Mounted on the upper end of the mast is the projector mounting assembly shown generally at 3 in Figure 2. The projector 24 which is substantially centrally located within the dome 10 by means of the projector mounting assembly and the telescoping mast may be adapted to project a single image or to project two images which will appear on the viewing areas 30 on the surface of the balloon 2 substantially opposite to each other. Suitable lenses are provided in the projector apparatus to provide for the projection of images which will be in focus on the substantially spherical surface of the balloon. It will be apparent that a variety of means other than a telescoping mast may be employed for lifting or hoisting the projector and the projector mounting assembly into position into the transparent dome 10.

The projector 24 is attached to the turntable 28. The turntable 28 is driven by a suitable motor and gear reduction arrangement within the housing 27. Power supply for the motor and the projector is provided through the cable 26. Power supply for the speakers and the warning light is provided through the cable 15 and through suitable interconnecting wiring not shown. The projector, the turntable and the drive unit and the housing 27 are mounted on the top of the gimbal or stabilizing structure 33 which is pivotally mounted on the top of the telescoping support mast by means of the ball and socket arrangement 32. This mounting provides assurance that the projector will remain in a normal position and will, at all times, project images outwardly with the center lines of projection being horizontal. Thus if the display device is moving or swaying in the air the condition will not occur where the image on one side of the balloon will be depressed toward the lower side of the balloon and the image on the other side of the balloon will be raised up toward the upper portion of the balloon and thus be at least in part invisible to viewers standing on the surface of the ground. Attached to the upper portion of the mast 22 is the member 34 which passes through a vertical slot 19 in the gimbal 33. The member 34 extending through the slot 19 is provided in order to prevent independent rotation of the gimbal 33 with respect to the mast 22. The vertical slot will, however, permit rocking of the gimbal or relative vertical motion of the portion of the gimbal forming the slot 19 with respect to the member 34.

Figure 3:
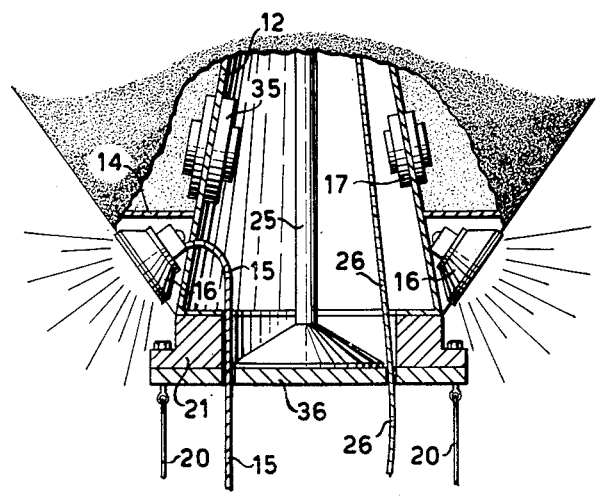
Figure 3 is a fragmentary showing of the display device tethered by cables.

There is shown in Figure 3 an alternate arrangement wherein the ballast flange 21 is affixed to cables 20 which serve to tether the display device when the gas chamber has been filled with a suitable gas lighter than air which will cause the display device to float. In this application the ballast flange 21 serves as a weight or a stabilizing keel in order to retain the floating balloon in a better condition of equilibrium. When the device is employed as a floating balloon the ballast plate is covered with a close-off plate 36 to which is mounted within the balloon a supporting member 25 which mounts the projector mounting assembly.

It will be apparent that the balloon or outer covering employed as the gas holder may be coated with materials as are well known in the art of manufacture of projector screens having a desirable effect upon the appearance of the image appearing thereon. By providing a projector in the form of a slide projector, a motion picture projector, or a projector adapted to employ an endless strip of film and project a succession of still images, moving or changing images can be made to appear on the surface of the outer cover.

The display device may be tethered over a main street in a city and changing images be made to appear to viewers on the street in either direction from the device. Alternately the projector apparatus may be made to rotate within the transparent dome thereby causing images still or in motion to travel about the circumference of the outer cover which will be held stationary.

It will be apparent that projection means, rotating or stationary with respect to the outer cover may be variously employed with a rotating or stationary structure, or with a white or colored covering or with a variously colored covering to produce various desirable advertising colored effects. By replacing various projection apparatus within the transparent dome, various types of advertising messages may be caused to appear on the surface of the outer covering.

As has been hereinbefore described, the provision of the dome 10 and tunnel 12 within the inflatable outer covering permits the projection apparatus to be replaced without deflating the gas holder. It will be apparent that if hoisting means are provided the projection apparatus may be replaced even when the device is inflated with a lighter than air gas, and is employed as a floating balloon without deflating the gas holder or lowering the balloon to the ground. It will be apparent that various modifications may be made in the embodiment of the invention disclosed herein without departing from the scope of the invention as set forth in the following claims.

What is claimed is:

1. An aerial display device comprising a gas-filled balloon, a transparent chamber positioned substantially centrally in said balloon, passage means connecting said chamber to the atmosphere, and projecting means mounted within said chamber and adapted and arranged to project an image upon the outer wall of said balloon.

2. An aerial display device comprising a gas-filled balloon adapted to be anchored to the ground, a transparent chamber positioned substantially centrally in said balloon, passage means connecting said chamber to the atmosphere, and projecting means mounted within said chamber and adapted and arranged to project an image upon the outer wall of said balloon, said projecting means being removable from said chamber through said passage means with said balloon in an inflated condition.

3. An aerial display device comprising a gas-filled balloon, a transparent chamber positioned substantially centrally in said balloon, a passage supporting said transparent chamber and connecting said transparent chamber to the atmosphere, image projecting means, means mounting said image projecting means within said transparent chamber, said projecting means being adapted to project an image upon the wall of said balloon, and means included in the mounting means for rotating said projecting means with respect to said balloon to cause the projected image to progress around the surface of said balloon.

4. An aerial display device comprising a gas-filled balloon, a transparent chamber positioned substantially centrally in said balloon, a passage supporting said transparent chamber and connecting said transparent chamber to the atmosphere, image projecting means, means mounting said image projecting means within said transparent chamber, said projecting means being adapted to project an image upon the wall of said balloon, and means included in the mounting means for raising said projector into and lowering said projector out of said transparent chamber through said passage.

5. An aerial display device comprising a gas-filled balloon, a transparent chamber positioned substantially centrally in said balloon, a passage supporting said transparent chamber and connecting said transparent chamber to the atmosphere, image projecting means, means mounting said image projecting means within said transparent chamber, said projecting means being adapted to project an image upon the wall of said balloon, and means included in the mounting means for raising said projector into and lowering said projector out of said transparent chamber through said passage while the balloon is in an inflated condition.

6. An aerial display device comprising a gas-filled balloon, a transparent chamber positioned substantially centrally in said balloon, a passage supporting said transparent chamber and connecting said transparent chamber to the atmosphere, image projecting means, means mounting said image projecting means within said transparent chamber, said projecting means being adapted to project an image upon the wall of said balloon, and means included in the mounting means for maintaining said projector in a normal steady position while the balloon is swaying in the air.

7. An aerial display device comprising a gas-filled enclosure, a transparent chamber, means mounting said transparent chamber within said enclosure, said transparent chamber being displaced from said enclosure and substantially surrounded by the gas filling said enclosure, and image projecting means mounted within said transparent chamber, said projecting means being adapted to project an image upon said enclosure.

JOHN J. MATELENA.

REFERENCES CITED

The following references are of record in the file of this patent:

UNITED STATES PATENTS

| Number | Name | Date |
| --- | --- | --- |
| 242,483 | Sisson | June 7, 1881 |
| 346,924 | Knell | Aug. 10, 1886 |
| 460,674 | Gross | Oct. 6, 1891 |
| 542,792 | Burgess | July 16, 1895 |
| 1,143,807 | Bumbaugh | June 22, 1915 |
| 1,923,725 | Haines | Aug. 22, 1933 |
| 1,948,295 | Haines et al. | Feb. 20, 1934 |

FOREIGN PATENTS

| Number | Country | Date |
| --- | --- | --- |
| 510,003 | Germany | Oct. 15, 1930 |